L. D. CAHN.
HANDLE FOR CULINARY VESSELS.
APPLICATION FILED MAR. 27, 1914.
1,155,792.
Patented Oct. 5, 1915.
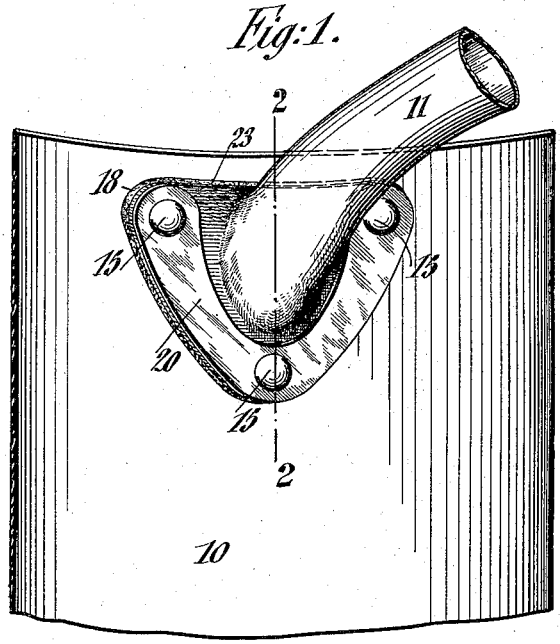
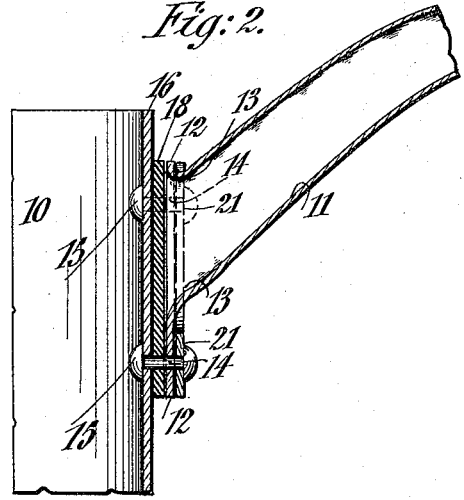
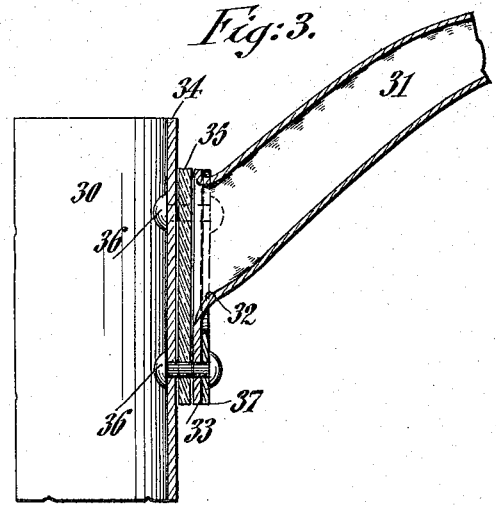
Witnesses:
F. Hogg.
Jos. Bisbano.
Inventor
Louis D. Cahn
By his Attorney
Carl P. Goepel

UNITED STATES PATENT OFFICE.

LOUIS D. CAHN, OF NEW YORK, N. Y.

HANDLE FOR CULINARY VESSELS.

1,155,792.  Specification of Letters Patent.  Patented Oct. 5, 1915.

Application filed March 27, 1914. Serial No. 827,650.

*To all whom it may concern:*

Be it known that I, LOUIS D. CAHN, a citizen of the United States of America, and a resident of New York, in the borough of Manhattan, county and State of New York, have invented certain new and useful Improvements in Handles for Culinary Vessels, of which the following is a specification.

This invention relates to culinary vessels, and more particularly has for its object to provide an improved vessel, by the use of which the handle does not become heated, and therefore no danger of injury is likely, so that the culinary vessel may be used with a great deal of freedom, and without the addition of any protecting rags or asbestos handle or the like.

My invention is shown in the accompanying drawing and will be more fully described hereinafter and finally pointed out in the claims.

In the accompanying drawing, Figure 1 is a perspective view of a portion of a culinary vessel with my improvement applied thereto, Fig. 2 is a vertical section on line 2—2 of Fig. 1, and Fig. 3 is a like section of a modified form of structure.

Similar characters of reference indicate corresponding parts throughout the various figures of the drawing.

Referring to the drawing, and more particularly to Figs. 1 and 2, the culinary vessel, which is shown in partial view, is indicated by 10, and at one side thereof, near the upper edge thereof, is provided with a handle 11, which is bent into the desired shape. The handle is provided with a flange portion 12, being bent outwardly by means of the curved portions 13, so as to form the flange portion 12. The flange portion is in turn provided with openings 14, three in number, through which openings rivets 15 pass, which are also three in number, as clearly shown in Fig. 1. Intermediate the flange portion 12 of the handle 11, and the wall 16 of the vessel 10, an insulating layer 18 of leather is provided, the object of which is to prevent the heat which is taken up by the culinary vessel 10 from being transmitted to the handle 11. In order to further secure the handle to the vessel, a V-shaped strengthening member 20 is provided, which has three openings 21, through which the rivets 15 may readily pass. This V-shaped strengthening member 20 gives an additional hold to the handle, and at the same time coöperates to compress in a circumferential manner, the insulating layer 18 against the culinary vessel, and to permit a certain comparative freedom of compression at the portion indicated by 23. By this insulating layer in the manner in which it is applied, a very efficient device is secured, and furthermore, as the culinary vessel 10 is usually made of aluminum, and the handle is made of steel, the difference of material, combined with the layer 18, prevents the heat from passing to the handle, and insures at all times a cool and readily manipulated handle to the heated culinary vessel.

In Fig. 3 a modified form is shown, in which the vessel 30 is provided with a handle 31 having a curved portion 32 and having a flange 33. Intermediate the flange and the wall 34 of the vessel, an insulating layer 35 is provided, which insulating layer 35, in the embodiment shown in Fig. 3, is of asbestos or the like. This insulating layer 35 is compressed by the rivets 36, and by reason of the use of the strengthening member 37, which is like that indicated by 20 in Fig. 1, a very efficient device is provided, as in this embodiment the culinary vessel 30 is made of aluminum, and the handle is of steel, and the difference of metals impedes the progress of the heat, and combined with the insulating material insures at all times a cool handle.

I have shown several embodiments of my invention, but it is clear that changes may be made therein without departing from the spirit of the invention as defined in the appended claims.

I claim:

1. An improved handle for culinary vessels having a V-shaped flange, an insulating layer therebetween and the vessel, and a strengthening V-shaped member circumferentially of the flange of the handle, and rivets passing through and connecting said vessel, insulating layer, and flange, the outer heads of said rivets being exterior to said strengthening member with respect to said vessel, said rivets passing through the vertex and at the ends of the legs of said flange and said member.

2. An improved handle for culinary vessels of aluminum, having a flange curved out therefrom of V-shape, said handle and flange being made of steel, an insulating layer between the flange and vessel, and a V-shaped strengthening member along the legs of the V-shaped flange of the handle, and rivets passing through the V-shaped strengthening member, the V-shaped flange of the handle, the insulating layer and the wall of the vessel, the outer heads of said rivets being exterior to said strengthening member with respect to said vessel.

In testimony that I claim the foregoing as my invention, I have signed my name in presence of two subscribing witnesses.

LOUIS D. CAHN.

Witnesses:
F. HOGG,
JOS. BISBANO.